United States Patent [19]
Bosco

[11] 3,784,099
[45] Jan. 8, 1974

[54] AIR POLLUTION CONTROL METHOD
[76] Inventor: Francis N. Bosco, 6119 W. 38th Ave., Wheat Ridge, Colo. 80033
[22] Filed: Dec. 13, 1971
[21] Appl. No.: 207,595

[52] U.S. Cl. ............................................... 239/2 R
[51] Int. Cl..... E01b 1/00, E01b 21/00, E01b 25/28
[58] Field of Search ...................................... 239/2 R

[56] References Cited
UNITED STATES PATENTS
3,630,950  12/1971  Papee et al. .................... 239/2 R
3,654,175  4/1972  Henderson ........................ 239/2 R Primary Examiner—Lloyd L. King
Attorney—Reilly and Lewis

[57] ABSTRACT

A mixture of seeding, pollutant inhibiting, and coalescing chemicals are vaporized and dispersed in a jetting action into the atmosphere to provide an aggregate of nuclei on the order of subcolloidal approximately submicromolecular sizes upon which nucleations of water vapor in the atmosphere take place free from adjacent nucleations to form water droplets and ice crystals with accompanying releases of latent heat, the water droplets, ice crystals further serving as nuclei in a breeding action for a chain reaction of latent heat releases with the vaporized coalescing chemicals aiding in the coalescence of water droplets and the released latent heat diffuses upwardly in an outward expansion to produce an updraft whereby to puncture atmospheric inversions and inhibit the formation of secondary pollutants.

12 Claims, No Drawings

AIR POLLUTION CONTROL METHOD

BACKGROUND OF THE INVENTION

This invention relates generally to alterations of existing atmospheric conditions and more particularly to a novel method for controlling air pollution.

The quality of the atmosphere has become a matter of increasing concern. The levels of air pollution must be lowered for the reasons of health, esthetics and economics. One approach to air pollution has been abatement at the source but to date the costs of emission control are enormous and substantially impractical.

Presently the chief sources of air pollution are waste products of combustion. The burning of coal and oil results in the production of sulfur and nitrogen oxide. The gasoline engine produces carbon monoxide and unburned hydrocarbons and nitrogen oxides. Solar energy is significant in producing reactions with the above primary pollutants to produce oxidants as secondary pollutants.

Atmospheric layering or inversions tend to trap pollutants and promote the most severe atmospheric pollution. A number of techniques are being utilized to monitor the pollution levels but at the present time there are no practical methods of substantially reducing or eliminating the deleterious pollutants from the atmosphere. A change in the meterological conditions such as an increase in wind velocity and increased air turbulence is one natural method available to remove the pollutants which collect as a result of stratefied air. Rain and snow are also a natural method available to remove pollutants. Some attempt has been made to add chemicals to the atmosphere to reduce pollution. In U. S. Pat. No. 3,084,024 iodine, bromine or chlorine are introduced into the atmosphere to inhibit photochemical reactions. In U. S. Pat. No. 3,499,723 a solution of ammonium iodide is sprayed in a mist from an aerosol container to suppress atmospheric pollution.

SUMMARY OF THE INVENTION

The present invention provides a highly effective method of reducing smog forming pollutants in the atmosphere utilizing a novel seeding technique which causes releases of latent heat from the condensation of water vapor into droplets and the congealing of the droplets into ice crystals which in turn serve as nuclei for a chain reaction of heat releases which induces an updraft so as to pierce the inversion layer and at the same time the chemicals used inhibit or prevent the formation of secondary or oxidant pollution products. In the past the approach for seeding clouds for producing rain has been to place excessive amounts of nuclei in the atmosphere to induce rainfall. The present invention departs from the previous cloud seeding methods employed in that in the method of the present invention only very minute aggregates of nuclei and specifically colloidal approximately sub-micromolecular sizes are dispersed in a volume of atmosphere in such a way that nucleations take place free from adjacent nucleations with the water droplets and ice crystals formed serving as nuclei in a chain reaction of latent heat releases with an accompanying coalescing of water droplets to increase the reaction to release large amounts of latent heat which in turn produces an updraft capable of moving the pollutants up through stratified atmosphere.

Accordingly, it is a general object of the present invention to provide a simple, effective and relatively low cost method of reducing the pollution content in the atmosphere.

Yet a further object of the present invention is to provide a novel method of reducing the pollutants in the air utilizing the latent heat produced by the dispersal of nucleating particles which cause water vapor in the atmosphere to condense and congeal.

Still another object of this invention is to provide a novel method of reducing the pollutants in the atmosphere or preventing pollution formation by dispersing chemicals in such a way that nucleations occur free from an adjacent nucleation to avoid massive reactions and self-quenching of the release of latent heat so that individual nucleations take place free from the effect of adjacent nucleations in a chain reaction of nucleations which in turn produces an updraft to puncture stratified layers of air.

A preferred technique of producing the release of latent heat from water vapor is to provide a mixture of chemicals including silver iodide having both nuclei producing and pollutant inhibiting properties when vaporized, sulphur which aids in the coalescence of water drops and a chemical such as barium sulphate and potassium nitrate and having combustible properties, the mixture being placed in a container having a restricted or venturi-like throat so that as the chamicals burn a jetting effect is produced which causes a dispersion of an aggregate of nuclei in a spatial relation to cause the desired isolated releases of the latent heat from the water vapor in the atmosphere, with the water droplets and ice crystals produced serving as nuclei for a chain reaction of latent heat releases. The sulphur aids in the coalescence of water droplets to increase the nucleations.

A device which has been found effective in producing this jetting effect is similar in construction to a railroad-type signal flare and includes a tubular body with a series of axially spaced venturi rings dividing the tubular body into a plurality of tubular sections. A mixture of chemicals comprising a charge is placed in each tubular section. The charge is ignited and the flame jets through the venturi rings which have a restricted throat causing vaporization of the chemicals into an aggregation of nuclei which may be characterized as colloidal and substantially sub-micromolecular in size. An approximate size for this aggregate of nuclei is about the cube root of Avagadros number of $6.02 \times 10^{23}$ molecules in a mass of a gas. The radius of each nuclei is estimated to be about 0.005 micron or smaller and a concentration of about 0.1 parts per million.

The following specific example sets forth the results obtained by utilizing the teachings of the present invention:

EXAMPLE

| | Preferred Mixture | Suitable Mixture Range |
|---|---|---|
| Silver iodide | 0.1 grams | 0.001–0.5 grams |
| Sulfur | 10 grams | 5–20 grams |
| Barium sulfate | 120 grams | 80–120 grams |
| Potassium nitrate | 10 grams | 6–30 grams |
| Diameter of venturi throat | ⅜ inches | ¼–⅝ inches |
| Internal diameter of tube | ⅞ inches | 0.75–1.0 inches |
| Length of charge in each tubular section | 3 inches | 2–10 inches |

In the above example the silver iodide is a source of nucleating particles which initiate the nucleations to cause the water vapor to condense into water droplets and congeal the water droplets into low crystals with an accompanying release of latent heat. For water the release of latent heat from vapor to liquid is about 540 calories per gram and from a liquid to solid is about 79.7 calories per gram. For a small storm of one kilometer radius with one centimeter of water precipitated, the mass of water precipitated is about 30,000 tons, which corresponds with a heat release of $2 \times 10^{13}$ calories as latent heat. The vaporized silver iodide is also a source of hologens which in the atmosphere inhibit the formation of secondary pollutants known as oxidants and discussed more fully in U. S. Pat. No. 3,084,024. The sulphur, its isotopes, and the products of combustion act as an active agent in aiding coalescence of the water drops hence aiding in the reaction. The barium sulphate and potassium nitrate produce the heat. Additionally, it may be found desirable at times to add small amounts of various other substances to modify the charge to further promote one of the above stages. Such additions may be incorporated in the charge without departing from the scope of the invention.

In the above example the charge was burned for 5, 10, 15 minute intervals. The flare devices were stationed at approximately 2 to 10 mile intervals.

With the burning of the flare there is an initial nucleation stage whereby the vaporized silver iodide particles produce nucleations by having the water vapor condense thereon into droplets and some of the droplets also congeal into the ice crystals. The next stage is a breeding stage wherein each droplet and ice crystal cause the water vapor to condense and congeal in a chain reaction of latent heat releases. The coalescing chemical aids in coalescence of the formed water droplets to aid in the reaction. The third stage is a diffusion stage whereby the latent heat released rises and expands to cause a draft capable of puncturing stratified layers of atmosphere which contribute greatly to undesirable pollution conditions.

It is appreciated that the release of chemicals in accordance with the present invention are useful in preventing the buildup of pollutants in the atmosphere as well as reducing their concentration. In other words if the meteorological data indicated future buildup the releases of the chemicals could be made to inhibit formation. Moreover, the releases may be timed to allow them to be carried with a rapid air movement toward an area of high pollutant levels to reduce the pollutant concentration.

Although the present invention has been described with a certain degree of particularity, it is understood that the present disclosure has been made by way of example and that changes in details of structure may be made without departing from the spirit thereof.

What is claimed is:

1. A method of controlling pollutants in atmosphere comprising the steps of:
   vaporizing a charge of chemicals having nuclei producing, pollutant inhibiting, and combustible properties,
   dispersing the vaporized chemicals in such a way as to produce an aggregate of nuclei of approximately submicromolecular sizes into the atmosphere upon which nucleations of water vapor take place free from adjacent nucleations to form water droplets and ice crystals with an accompanying release of latent heat to initiate a chain reaction of nucleations releasing additional latent heat to produce an updraft which is capable of moving the pollutants upwardly through stratified atmosphere, the vaporized chemicals combining with solar energy to inhibit the formation of secondary pollutants.

2. A method as set forth in claim 1 wherein said chemicals are vaporized by burning in a flame.

3. A method as set forth in claim 2 wherein said chemicals are dispersed by jetting the burning chemicals into the atmosphere.

4. A method as set forth in claim 1 wherein said chemicals include silver iodide, sulfur, barium sulfate and potassium nitrate.

5. A method as set forth in claim 4 wherein the vaporized silver iodide produces halide particles which serve to inhibit the formation of oxidants.

6. A method as set forth in claim 4 wherein said silver iodide comprises between about 0.01 and about 0.1 weight percent of the charge.

7. A method as set forth in claim 4 wherein said sulphur comprises between about 0.5 and about 7 weight percent of the charge.

8. A method as set forth in claim 1 wherein said aggregate nuclei are approximately 0.005 micron and smaller and are at a concentration of approximately 0.1 parts per million.

9. A method as set forth in claim 1 wherein said updraft produces a low pressure system to draw air upward from the surface of the ground over a one-half mile to several mile radius.

10. A method as set forth in claim 1 wherein said releases are at selected spaced 2 to 10 mile intervals at ground stations.

11. A method of controlling the pollutants resulting from the combustion processes for a volume of the atmosphere which are maintained due to stagnant air layers comprising the steps of:
    releasing a controlled amount of colloidal, approximately sub-micromolecular nuclei into the atmosphere in such a way as to place approximately a one molecule nuclei upon which nucleations of water vapor take place to produce water droplets and ice crystals with a release of latent heat to initiate a chain reaction of nucleations of the water vapor in the atmosphere free from adjacent condensations whereby the latent heat released produces an updraft effect which contributes to the movement of the pollutants upwardly in the atmosphere.

12. A method of controlling pollutants in the atmosphere comprising the steps of:
    vaporizing a charge of chemicals consisting essentially of silver iodide, sulphur, barium sulfate and potassium nitrate and
    dispersing the vaporized chamicals through a venturi-like throat by burning to produce an aggregate of nuclei of approximately sub-micromolecular sizes into the atmosphere upon which nucleations of water vapor take place free from adjacent nucleations to form water droplets and ice crystals with an accompanying release of latent heat to produce an updraft which is capable of moving the pollutants upwardly through stratified atmosphere, the vaporized chemicals coalescing the water droplets and combining the solar energy to inhibit the formation of secondary pollutants.

* * * * *